(12) United States Patent
Miki

(10) Patent No.: US 10,056,607 B2
(45) Date of Patent: *Aug. 21, 2018

(54) ACTIVE MATERIAL COMPOSITE PARTICLE AND LITHIUM BATTERY

(71) Applicant: TOYOTA JIDOSHA KABUSHIKI KAISHA, Toyota-shi, Aichi-ken (JP)

(72) Inventor: Nariaki Miki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 37 days.

This patent is subject to a terminal disclaimer.

(21) Appl. No.: 15/015,201

(22) Filed: Feb. 4, 2016

(65) Prior Publication Data

US 2016/0268595 A1 Sep. 15, 2016

(30) Foreign Application Priority Data

Mar. 12, 2015 (JP) .................. 2015-049846

(51) Int. Cl.

| H01M 4/36 | (2006.01) |
|---|---|
| H01M 4/525 | (2010.01) |
| H01M 10/052 | (2010.01) |
| H01M 4/13 | (2010.01) |
| H01M 4/139 | (2010.01) |

(Continued)

(52) U.S. Cl.

CPC .......... *H01M 4/366* (2013.01); *H01M 4/525* (2013.01); *C01G 35/00* (2013.01); *C01G 53/50* (2013.01); *C01P 2004/84* (2013.01); *C01P 2006/40* (2013.01); *H01M 4/13* (2013.01); *H01M 4/139* (2013.01); *H01M 4/62* (2013.01); *H01M 10/052* (2013.01); *H01M 10/0562* (2013.01)

(58) Field of Classification Search

CPC ...... H01M 4/366; H01M 10/052; H01M 4/13; H01M 4/139; H01M 4/525; H01M 10/0562; H01M 4/62; C01G 35/00; C01G 53/50; C01P 2006/04; C01P 2004/84

USPC ........................................................ 429/231.1

See application file for complete search history.

(56) References Cited

U.S. PATENT DOCUMENTS

| 2009/0081554 A1* | 3/2009 | Takada | H01M 4/13 |
|---|---|---|---|
| | | | 429/322 |
| 2010/0104942 A1* | 4/2010 | Lange | H01M 4/661 |
| | | | 429/206 |

(Continued)

FOREIGN PATENT DOCUMENTS

| CN | 103124695 A | 5/2013 |
|---|---|---|
| JP | 2004-179158 A | 6/2004 |

(Continued)

OTHER PUBLICATIONS

Motohashi et al. Crystal Structure and Superconducting Properties of Hexagonal Lithium-Niobium Oxynitride in "Inorganic Chemistry, Year 2012, vol. 51 pp. 11184-11189".*

(Continued)

*Primary Examiner* — Jonathan G Jelsma
*Assistant Examiner* — Omar M Kekia
(74) *Attorney, Agent, or Firm* — Oliff PLC

(57) ABSTRACT

Provided is an active material composite particle with which the reaction resistance of a battery can be reduced. The active material composite particle includes an active material and a lithium niobate layer formed on a surface of the active material, wherein the lithium niobate layer includes nitrogen.

3 Claims, 5 Drawing Sheets

(51) Int. Cl.
*H01M 4/62* (2006.01)
*H01M 10/0562* (2010.01)
*C01G 35/00* (2006.01)
*C01G 53/00* (2006.01)

(56) References Cited

U.S. PATENT DOCUMENTS

| | | |
|---|---|---|
| 2013/0209890 A1 | 8/2013 | Nagatomi |
| 2014/0308572 A1 | 10/2014 | Tsuchida et al. |
| 2016/0043391 A1 | 2/2016 | Nagatomi |
| 2016/0315324 A1* | 10/2016 | Miki ............... H01M 4/628 |
| 2017/0018772 A1 | 1/2017 | Satow et al. |

FOREIGN PATENT DOCUMENTS

| | | |
|---|---|---|
| JP | 2010-244847 A | 10/2010 |
| JP | 2012074240 A | 4/2012 |
| JP | 2012-099323 A | 5/2012 |
| JP | 2014-049310 A | 3/2014 |
| JP | 2015-008073 A | 1/2015 |
| JP | 2015-056307 A | 3/2015 |
| KR | 10-2013-0140684 A | 12/2013 |
| WO | 2007/004590 A1 | 1/2007 |

OTHER PUBLICATIONS

Le Quang Nguyen and Vo-Van Truong, "Thin Fiilm of Lithium Niobium Oxynitride as Ionic Conductor" in Journal of Applied Physics, vol. 80, No. 5, Sep. 1, 1996, pp. 2914-2917.*
Bentini et al., "Damage Effects Produced in the Near-Surface Region of X-Cut LiNbO3 by Low Dose, High Energy Implantation of Nitrogen, Oxygen, and Fluorine Ions," Journal of Applied Physics, vol. 96, No. 1, pp. 242-247, (2004).
Vennos, Deborah et al., "Structure of Lithium Niobium Nitride," Acta Cryst., C48, pp. 610-612, (1992).
Ohta, Narumi et al. "LiNbO3-coated LiCoO2 as cathode material for all solid-state lithium secondary batteries," Electrochemistry Communications, vol. 9, No. 7, Jun. 15, 2007 pp. 1486-1490.
U.S. Appl. No. 15/091,141, filed Apr. 5, 2016 in the name of Miki et al.
Nguyen, Le Quang et al. "A Novel Lithium Conductor Prepared by Unbalanced Magnetron r.f. Sputtering". Thin Solid Films, vol. 293, pp. 175-178, 1997.
May 23, 2018 Office Action issued in U.S. Appl. No. 15/091,141.

* cited by examiner

ACTIVE MATERIAL COMPOSITE PARTICLE AND LITHIUM BATTERY

TECHNICAL FIELD

The present disclosure relates to an active material composite particle including an active material and a lithium niobate layer formed on at least a part of the surface of the active material. The present disclosure also relates to a lithium battery having the active material composite particle.

BACKGROUND

All-solid-state batteries are known as batteries excellent in safety. As a technique relating to all-solid-state batteries, a technique of making a composite particle by forming an ion conductive oxide on the surface of an active material is known. For example, WO 2007/004590 discloses a technique of forming an $LiNbO_3$ covering layer on the surface of an $LiCoO_2$ powder, via a process of hydrolyzing an alkoxide solution including lithium and niobium, at the surface of an $LiCoO_2$ powder particle. JP 2012-74240 A discloses a lithium-transition metal oxide particle whose carbon content is no more than 0.03 mass %, consisting of a lithium-transition metal oxide particle. At least a part of the surface of the lithium-transition metal oxide particle is covered by a covering layer including lithium niobate.

SUMMARY

Technical Problem

With the technique disclosed in WO 2007/004590, an $LiNbO_3$ covering layer is formed on the surface of a cathode active material. Thus, it is possible to interpose a lithium ion conductive oxide layer at an interface between a solid electrolyte and the cathode active material, and as a result, improvement in the output characteristic of an all-solid-state battery is expected. However, with the $LiNbO_3$ layer produced with an alkoxide solution, the resistance of an all-solid-state battery easily increases since the lithium ion conductivity of the layer is small. As a result, the output characteristic of the all-solid-state battery is difficult to improve. Even though the technique disclosed in WO 2007/004590 and the technique disclosed in JP 2012-74240 A are combined, this problem is difficult to be solved.

An object of the present disclosure is to provide an active material composite particle with which the reaction resistance of a battery can be reduced and a lithium ion battery having the active material composite particle.

Solution to Problem

As a result of intensive researches, the inventor of the present disclosure found that it is possible to reduce the reaction resistance of a lithium battery, by including nitrogen into a lithium niobate layer, in an active material composite particle including an active material and the lithium niobate layer formed on the surface of the active material. Specifically, the inventor found that it is possible to further reduce the reaction resistance of the lithium battery, by making the nitrogen ratio in the lithium niobate layer within a predetermined range. The present invention has been made based on the above findings.

A first aspect of the present disclosure is an active material composite particle including: an active material; and a lithium niobate layer formed on a surface of the active material, wherein the lithium niobate layer includes nitrogen.

In the first aspect of the present disclosure, it is preferable that a ratio ($C_N/C_{Nb}$) of an element concentration of the nitrogen $C_N$ (atm %) to an element concentration of niobium $C_{Nb}$ (atm %) on a surface of the lithium niobate layer (surface to be on the outside of the composite particle) is no less than 0.08 and no more than 0.26.

In the present disclosure, the "lithium niobate layer" refers to a layer including lithium niobate.

In addition, in the present disclosure, the "element concentration" of each element at the surface of the lithium niobate layer of the active material composite particle can be identified by analyses of the surface of the active material composite particle, by a photoelectron spectroscopic analyzer (PHI Quantera SXM, manufactured by Physical Electronics). Specifically, the identification is carried out by calculating, after a peak-shift correction at C1s (248.7 eV), the element concentration from the peaks of photoelectron spectrum of Nb3d and N1s. The calculation of the element concentration is carried out with the following formula (1), on the basis of the peak intensity (peak area) of each element and its relative response factor.

[Formula 1]
$$C_i = \frac{(I_i/S_i)}{\sum_{j=1}^{N}(I_j/S_j)} \times 100 \qquad (1)$$

(in the formula (1), C is element concentration (atm %), I is photoelectron intensity (peak area), S is relative response factor, subscripts i and j are kinds of elements)

That is, in the present disclosure, the ratio ($C_N/C_{Nb}$) of the element concentration of nitrogen $C_N$ (atm %) to the element concentration of niobium $C_{Nb}$ (atm %) at the surface of the lithium niobate layer is calculated from the following formula (2). Here, the relative response factor S is 3.127 for niobium and 0.499 for nitrogen.

[Formula 2]
$$\frac{C_N}{C_{Nb}} = \frac{(I_N/S_N)}{(I_{Nb}/S_{Nb})} \qquad (2)$$

A second aspect of the present disclosure is a lithium battery including: a cathode; an anode; and an electrolyte layer having contact with the cathode and the anode, wherein the cathode includes the active material composite particle according to claim 1 or 2 and a solid electrolyte having contact with the active material composite particle.

According to an embodiment of the present disclosure, it is possible to provide an active material composite particle with which the response resistance of a battery can be reduced and a lithium battery having the active material composite particle.

DESCRIPTION OF EMBODIMENTS

Hereinafter the various embodiments and aspects of the present disclosure will be described with reference to the drawings. It is noted that the embodiments shown below are examples of the present disclosure, and the present disclosure is not limited to the embodiments shown below.

1. Active Material Composite Particle

Figure 1:
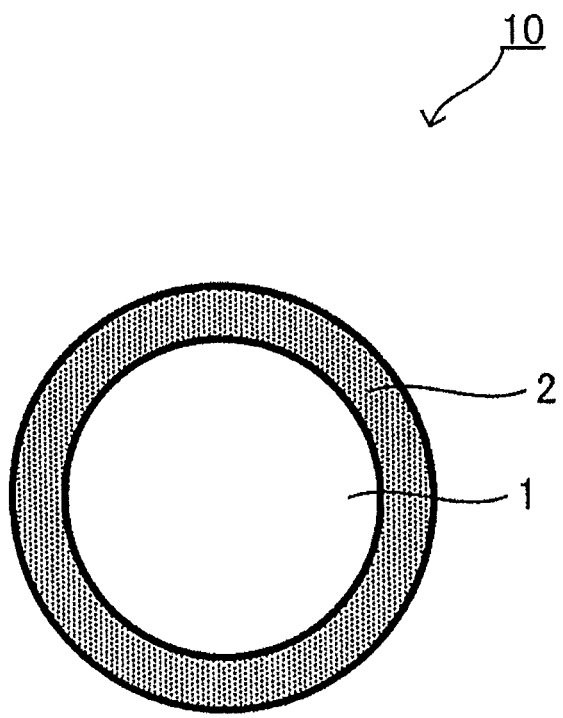
FIG. 1 is a view describing an active material composite particle 10 of the present disclosure.

FIG. 1 is a view describing an active material composite particle of the present disclosure. In FIG. 1, one active material composite particle 10 is extracted being simplified. For convenience, FIG. 1 shows an embodiment where a lithium niobate layer is formed on the surface of one active material. However, the active material composite particle of the present disclosure is not limited to this embodiment. The active material composite particle of the present disclosure may have an embodiment where the lithium niobate layer is formed on the surface of an active material which is a secondary particle of aggregated active materials.

As shown in FIG. 1, the active material composite particle 10 includes an active material 1 and a lithium niobate layer 2 formed on the surface of the active material 1. Here, the active material composite particle 10 has a feature that the lithium niobate layer 2 includes nitrogen.

1.1. Active Material 1

In the present disclosure, the active material 1 is not particularly limited as long as it is a material which can be used as a material for active material of lithium ion secondary batteries. Examples of such a material include $LiCoO_2$, $LiNi$—$Co_{1-x}O_2$ (0<x<1), $LiNi_{1/3}Co_{1/3}Mn_{1/3}O_2$, $LiMnO_2$, different kind element substituent Li—Mn spinels ($LiMn_{1.5}NiO_{0.5}O_4$, $LiMn_{1.5}Al_{0.5}O_4$, $LiMn_{1.5}Mg_{0.5}O_4$, $LiMn_{1.5}Co_{0.5}O_4$, $LiMn_{1.5}Fe_{0.5}O_4$, $LiMn_{1.5}Zn_{0.5}O_4$), lithium titanates (e.g. $Li_4Ti_5O_{12}$), lithium metal phosphates ($LiFePO_4$, $LiMnPO_4$, $LiCoPO_4$, $LiNiPO_4$), transition metal oxides ($V_2O_5$, $MoO_3$), $TiS_2$, carbon materials such as graphite and hard carbons, $LiCoN$, $SiO_2$, $Li_2SiO_3$, $Li_4SiO_4$, lithium metals (Li), lithium alloys (LiSn, LiSi, LiAl, LiGe, LiSb, LiP), lithium storage intermetallic compounds (e.g. $Mg_2Sn$, $Mg_2Ge$, $Mg_2Sb$, $Cu_3Sb$), and the like. Here, for an all-solid-state battery having the active material composite particle of the present disclosure, two materials whose potentials (charging/discharging potential) at which lithium ions are adsorbed/desorbed are different from each other can be chosen from the materials described above as examples. From the two materials, the material having a nobler potential can be used for a cathode active material, and the material having a baser potential can be used for an anode active material. Specifically, the active material 1 is preferably a cathode active material, which makes it possible to make an all-solid-state battery having any voltages. The form of the active material 1 is not particularly limited as long as the active material composite particle 10 can be structured. The diameter of the primary particle of the active material 1 is preferably no less than 1 nm and no more than 100 μm. The lower limit is preferably no less than 10 nm, further preferably no less than 100 nm, especially preferably no less than 500 nm. The upper limit is preferably no more than 30 μm, further preferably no more than 3 μm.

1.2. Lithium Niobate Layer 2

The lithium niobate layer 2 is a layer including lithium niobate. In the present disclosure, it is preferable that the lithium niobate layer 2 includes no less than 90 mass % and no more than 99 mass % of lithium niobate. In view of easy reduction of the reaction resistance, it is preferable that the impurities in the lithium niobate layer 2 such as hydrated water are little, the layer is amorphous, and gaps in the layer are little. The amount of the impurities is preferably no more than 10 mass %.

With intensive researches, the inventor of the present disclosure found that it is possible to reduce the reaction resistance of the lithium niobate layer 2, which is a coat layer of the active material composite particle 10, by including nitrogen in the lithium niobate layer 2. Though the mechanism thereof is unknown, it can be considered that the crystalline structure of lithium niobate deforms when nitrogen is introduced in the lithium niobate layer 2, which results in an improvement of the lithium ion conductivity.

The element concentration of nitrogen in the lithium niobate layer 2 is not particularly limited as long as the effect of the present disclosure is provided.

It is noted that the inventor of the present disclosure found, as a result of intensive studies, that the reaction resistance of the lithium niobate layer 2 further remarkably reduces and the lithium ion conductivity greatly increases, by making the ratio ($C_N/C_{Nb}$) of the element concentration of nitrogen ($C_N$) to the element concentration of the niobium ($C_{Nb}$) at the surface of the lithium niobate layer, no less than 0.08 and no more than 0.53. The lower limit of $C_N/C_{Nb}$ is preferably no less than 0.11, and the upper limit is preferably no more than 0.42, especially preferably no more than 0.26.

Specifically, when $C_N/C_{Nb}$ is no less than 0.08 and no more than 0.26, the reaction resistance of the lithium niobate layer 2 reduces to approximately 1/300, and when $C_N/C_{Nb}$ is no less than 0.11 and no more than 0.19, the reaction resistance reduces to 1/400, compared to the reaction resistance in a case where nitrogen is not included.

The lithium niobate like this can be formed for example by a method described later. The thickness of the lithium niobate layer 2 is not particularly limited, and preferably no less than 3 nm and no more than 100 nm, in view of further reducing the reaction resistance.

As described above, it is possible to provide an active material composite particle with which the reaction resistance of a battery can be reduced, by including nitrogen in the lithium niobate layer 2, like the active material composite particle 10.

2. Lithium Battery

Figure 2:
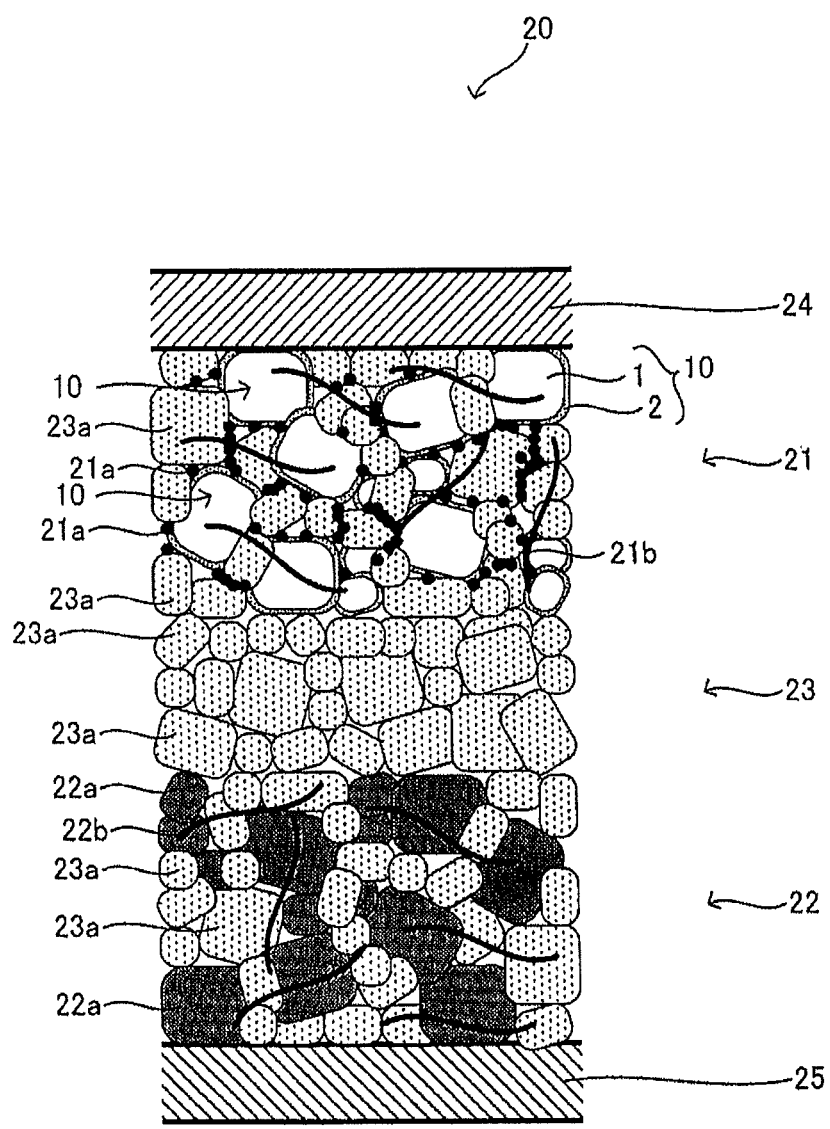
FIG. 2 is a view describing a lithium battery 20 of the present disclosure.

FIG. 2 describes a lithium battery 20 of the present disclosure. In FIG. 2, the lithium battery 20 is shown being simplified, and the descriptions of exterior bodies and the like are omitted. As shown in FIG. 2, the lithium battery 20 includes a cathode 21, an anode 22, an electrolyte layer 23 having contact with the cathode 21 and the node 22. The cathode 21 includes the active material composite particle 10 and a solid electrolyte 23a having contact with the active material composite particle 10. In the lithium battery 20, a cathode current collector 24 connects with the cathode 21, and an anode current collector 25 connects with the anode 22. The cathode 21 includes a conductive assistant 21a and a binder 21b, in addition to the active material composite particle 10 and the solid electrolyte 23a. The anode 22 includes an anode active material 22a, a solid electrolyte 23a, and a binder 22b. The electrolyte layer 23 includes the solid electrolyte 23a.

2.1. Cathode 21

2.1.1. Active Material Composite Particle 10

The cathode 21 includes the active material composite particle 10 as a cathode active material. For the lithium battery 20, two materials whose potentials (discharging/charging potential) at which lithium ions are absorbed/desorbed are different from each other can be chosen from the above materials described as specific examples of the active material 1. From the two materials, the material showing a nobler potential can be used as the active material 1, and the material showing a baser potential can be used as the anode active material 22a described later. The content of the active material composite particle 10 in the cathode 21 is not particularly limited, and preferably no less than 40 mass % and no more than 99 mass % for example.

2.1.2. Solid Electrolyte 23a

The cathode 21 may include a known solid electrolyte. In the cathode 21, a part of the solid electrolyte has contact with the active material composite particle 10. Examples of the solid electrolyte 23a which may be included in the cathode 21 include sulfide-based solid electrolytes such as $Li_2S$—$SiS_2$, $LiI$—$Li_2S$—$SiS_2$, $LiI$—$Li_2S$—$P_2S_5$, $LiL$-$Li_2O$—$Li_2S$—$P_2S_5$, $LiI$—$Li_2S$—$P_2O_5$, $LiI$—$Li_3PO_4$—$P_2S_5$, $Li_2S$—$P_2S_5$ and $Li_3PS_4$. The method for manufacturing the solid electrolyte 23a which may be used for the lithium battery of the present disclosure is not particularly limited, and a solid electrolyte manufactured by a known manufacturing method may be adequately used. In addition, the solid electrolyte 23a may be amorphous or crystalline. The content of the solid electrolyte 23a in the cathode 21 is not particularly limited.

2.1.3. Conductive Assistant 21a

The cathode 21 may include the conductive assistant 21a. Examples of the conductive assistant 21a which may be included in the cathode 21 include carbon materials such as vapor-grown carbon fibers, acetylene black (AB), ketjen black (KB), carbon nanotube (CNT), and carbon nanofiber (CNF), and metal materials which can endure the environment where the lithium battery is used. The content of the conductive assistant 21a in the cathode 21 is not particularly limited.

2.1.4. Binder 21b

The cathode 21 may include the binder 21b which bonds the active material composite particle 10, the solid electrolyte 23a, and the conductive assistance 21a, in addition to the active material composite particle 10, the solid electrolyte 23a, and the conductive assistant 21a. Examples of the binder 21b which may be included in the cathode 21 include acrylonitrile butadiene rubber (ABR), butadiene rubber (BR), polyvinylidene difluoride (PVdF), styrene butadiene rubber (SBR) and the like. The content of the binder 21b in the cathode 21 is not particularly limited.

2.1.5. Cathode Current Collector 24

The cathode 21 connects with the cathode current collector 24. As the cathode current collector 24, a known metal which can be used as a current collector of lithium batteries can be used. Examples of such a metal include metal materials including one or two or more elements selected from the group consisting of Cu, Ni, Al, V, Au, Pt, Mg, Fe, Ti, Co, Cr, Zn, Ge, and In. The shape of the cathode current collector 24 is not particularly limited, and various shapes such as a foil and a mesh can be taken.

The cathode 21 can be manufactured for example by: adding the active material composite particle 10, the solid electrolyte 23a, the conductive assistant 21a, and the binder 21b into a solvent; dispersing them by an ultrasonic homogenizer and the like, to make a cathode composition in a slurry form; thereafter applying the cathode composition onto the surface of the cathode current collector 24; and drying it. As the solvent used in this case, though not particularly limited, a nonpolar solvent is preferable. The thickness of the cathode is, for example, preferably no less than 0.1 μm and no more than 1 mm, and more preferably no less than 1 μm and no more than 100 μm. The cathode can be manufactured via a process of pressing. In the present disclosure, the pressure in pressing the cathode can be around 100 MPa.

2.2. Anode 22

2.2.1. Anode Active Material 22a

The anode active material 22a to be included in the anode 22 is as described above. The shape of the anode active material 22a is not particularly limited, and can be a particle and a thin-film shape for example. The average particle size ($D_{50}$) of the anode active material is, for example, preferably no less than 1 nm and no more than 100 μm, and more preferably no less than 10 nm and no more than 30 μm. The content of the anode active material 22a in the anode 22 is not particularly limited, and preferably no less than 40 mass % and no more than 99 mass % for example.

2.2.2. Solid Electrolyte 23a

The anode 22 may also include the solid electrolyte 23a, in the same manner as in the cathode 21. The content of the solid electrolyte 23a in the anode 22 is not particularly limited.

2.2.3. Binder 22b

If necessary, the anode 22 may include the binder 22b to bond the anode active material 22a and the solid electrolyte 23a, in addition to the anode active material 22a and the solid electrolyte 23a. Examples of such a binder include the above-mentioned binders which can be included in the cathode 21.

2.2.4. Conductive Assistant

The anode 22 may include a conductive assistant which improves conductivity, which is not shown in FIG. 2. Examples of the conductive assistant which may be included in the anode 22 include the above-mentioned conductive assistants which can be included in the cathode.

2.2.5. Anode Current Collector 25

The anode 22 connects with the anode current collector 25. As the anode current collector 25, a known metal which can be used as a current collector of lithium batteries can be used. Examples of such a metal include metal materials including one or two or more elements selected from the group consisting of Cu, Ni, Al, V, Au, Pt, Mg, Fe, Ti, Co, Cr, Zn, Ge, and In. The shape of the anode current collector 25 is not particularly limited, and various shapes such as a foil and a mesh can be taken.

The anode 22 can be manufactured by: adding the anode active material 22a, the solid electrolyte 23a, and the binder 22b into a solvent; dispersing them by an ultrasonic homogenizer and the like, to make an anode composition in a slurry form; applying the anode composition onto the surface of the anode current collector 25; and drying it. As the solvent used in this case, though not particularly limited, a nonpolar solvent is preferable. The thickness of the anode 22 is, for example, preferably no less than 0.1 μm and no more than 1 mm, more preferably no less than 1 μm and no more than 100 μm. The anode 22 can be manufactured via a process of pressing. In the present disclosure, the pressure in pressing the anode 22 is preferably no less than 200 MPa, and more preferably around 400 MPa.

2.3. Electrolyte Layer 23

As the solid electrolyte 23a to be included in the electrolyte layer 23, a known solid electrolyte which can be used for an all-solid-state battery can be adequately used. Examples of such a solid electrolyte include the above-mentioned solid electrolyte which can be included in the cathode 21 and the anode 22. The content of the solid electrolyte 23a in the electrolyte layer 23 is, for example, preferably no less than 60 mass %, more preferably no less than 70 mass %, especially preferably no less than 80 mass %.

A binder, which is not shown in FIG. 2, for bonding each solid electrolyte can be included in the electrolyte layer 23, in view of development of plasticity and the like. Examples of such a binder include the above-mentioned binders which can be included in the cathode 21 and the anode 22. It is noted that the content of the binder in the electrolyte layer 23 is preferably no more than 5 mass %, in view of making it possible to form a solid electrolyte layer having a solid electrolyte not excessively aggregated but uniformly dispersed, in order to easily realize a high output.

The electrolyte layer 23 can be manufactured via a process of pressing the solid electrolyte 23a and the like for example. Alternatively, the electrolyte layer 23 can be manufactured via: dispersing the solid electrolyte 23a and the like in a solvent, to adjust a solid electrolyte composition in a slurry form; and applying the solid electrolyte composition onto a base material. As the solvent used in this case, though not particularly limited, a nonpolar solvent is preferable. The thickness of the solid electrolyte layer is, though widely different depending on the structure of the battery, for example preferably no less than 0.1 μm and no more than 1 mm, and more preferably no less than 1 μm and no more than 100 μm.

The electrolyte layer 23 may be a layer including a non-aqueous electrolytic solution instead of the solid electrolyte 23a. However, in view of having a lithium battery excellent in safety, it is preferable that the electrolyte layer 23 includes the solid electrolyte 23a but does not include a non-aqueous electrolytic solution.

2.4. Other Member

The lithium battery 20 may be used in a state of being contained in a known exterior body which can be used for a lithium battery, which is not shown in FIG. 2. Examples of the exterior body include a known laminate film and metal housing.

As described above, the lithium battery 20 includes the cathode 21 including the active material composite particle 10 of the present disclosure. This makes it possible to obtain the lithium battery 20 whose reaction resistance is reduced.

3. Method for Manufacturing Active Material Composite Particle

Figure 3:
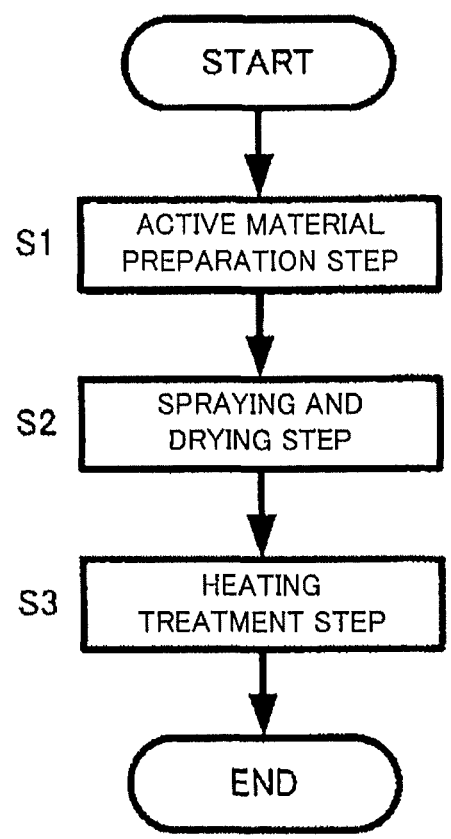
FIG. 3 is a flowchart to explain a method for manufacturing the active material composite particle of the present disclosure.

FIG. 3 is a flowchart to explain a method for manufacturing the active material composite particle of the present disclosure. The method for manufacturing the active material composite particle of the present disclosure shown in FIG. 3 includes an active material preparation step (S1), a spraying and drying step (S2), and a heating treatment step (S3).

3.1. Active Material Preparation Step (S1)

S1 is a step of preparing an active material. Lithium niobate attaches to the surface of the active material, in the step described later. S1 is not particularly limited as long as the active material can be prepared. In S1, the active material may be prepared by manufacturing, or may be prepared by purchasing.

3.2. Spraying and Drying Step (S2)

S2 is a step of spraying a solution including lithium and a peroxo complex of niobium, onto the active material prepared in S1, and at the same time, drying the solution sprayed onto the active material. The structural formula of the peroxo complex of niobium is as described later. Examples of the solution to be sprayed onto the active material in S2 include a solution (hereinafter may be referred to as "complex solution") obtained by: making a transparent solution using hydrogen peroxide water, niobium acid, and an ammonium solution; thereafter adding lithium salt in the obtained transparent solution. Here, according to the presumption of the inventor, nitrogen in the lithium niobate layer does not originate from ammonia, but originates from niobium acid (nitrogen mixed in the raw material of niobium acid). That is, in S2, a raw material including nitrogen is used as the raw material of niobium acid. For example, niobium acid including nitrogen is preferable. The method of including nitrogen in the raw material of niobium acid is not particularly limited. For example, after dissolution of a material ore with acid and the like, and extraction of solvent, nitrogen can be included by a use of a nitrogen-containing reagent, in making niobium deposited. Even though the water content ratio of the niobium acid used in S2 changes, a peroxo complex of niobium can be synthesized. Therefore, the water content ratio of niobium acid is not particularly limited. The mixing ratio of niobium acid and the ammonia solution is not particularly limited as long as a peroxo complex of niobium can be synthesized. Examples of the lithium salt which can be used in S2 include LiOH, $LiNO_3$, $Li_2SO_4$, and the like.

[Chemical Formula 1]

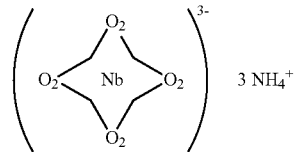

By the spraying in S2, the complex solution including a niobium compound and lithium compound is attached onto the surface of the active material. By the drying in S2, the volatile element included in the complex solution attached to the surface of the active material, such as the solvent and hydrated water, is removed. Hereinafter, the form after the complex solution is dried may be referred to as "precursor of lithium niobate".

In S2, the complex solution is sprayed onto the active material, and at the same time, the complex solution attached to the active material sprayed onto the active material is dried. S2 like this can be done by means of a tumbling fluidized coating machine, a spray dryer, and the like. Examples of the tumbling fluidized coating machine include Multiplex manufactured by POWREX CORPORATION, Flow coater manufactured by FREUND CORPORATION, and the like. In a case where a tumbling fluidized coating machine is used in S2, focusing on one active material, the complex solution is dried immediately after sprayed onto the active material, thereafter the spraying of the complex solution onto the active material and drying of the complex solution sprayed onto the active material are repeated until the thickness of the layer of precursor of lithium niobate attached to the surface of the active material has a desired thickness. In a case where a tumbling fluidized coating machine is used in S2, focusing on a plurality of active materials existing in the machine, active materials onto which the complex solution is sprayed and active materials whose complex solution on the surfaces is dried are mixed. Therefore, S2 can be referred to as a step of spraying the complex solution onto the active materials and at the same time drying the complex solution attached to the surfaces of the active materials.

Hydrogen peroxide included in the complex solution has a strong oxidizing property. Therefore, if the active material has contact with the complex solution for a long time, the active material is possibly eroded with the hydrogen peroxide, and the eroded active material deteriorates. Thus, in the present disclosure, in order to make a configuration with which the active material is difficult to deteriorate, immediately after the complex solution is sprayed onto the active material to attach to the surface of the active material, the complex solution existing on the surface of the active material is dried. By having such a configuration, it is possible to easily manufacture an active material composite particle with which the reaction resistance of a battery can be reduced.

In addition, by S2 in which the complex solution is sprayed onto the active material and at the same time the complex solution on the surface of the active material is dried, a precursor of lithium niobate attaches to the surface of the active material. Whereby it is possible to form lithium niobate on the surface of the active material, even if the temperature of the heating treatment at the heating treatment step carried out after S2 is decreased. The effects obtained by the decrease of the temperature of the heating treatment will be described later.

In the present disclosure, it is also possible to further adjust the amount of nitrogen included in the lithium niobate layer, by adjusting the spray amount and spray speed of the complex solution onto the active material and drying temperature (intake temperature) in S2. According to the findings of the inventor of the present disclosure, it is possible to increase the amount of nitrogen included in the lithium niobate layer, by increasing the spray amount, spray speed, and draying temperature of the complex solution. Each condition can be adjusted so as to satisfy a desired nitrogen ratio.

3.3. Heating Treatment Step

S3 is a step of carrying out a heating treatment of the active material having a precursor of lithium niobate attached on its surface, at a temperature higher than 123° C. and lower than 350° C., after S2. By having S3, it is possible to obtain an active material composite particle including an active material and a lithium niobate layer formed on the surface of the active material. The heating treatment of S3 can be carried out in the atmosphere. It is noted that nitrogen in the atmosphere is inert, and nitrogen in the atmosphere is not taken in the lithium niobate layer, even though the heating treatment is carried out in S3.

In S3, the temperature of the heating treatment is made higher than 123° C. By carrying out the heating treatment at a temperature like this, it is possible to reduce the remaining amount of impurities (volatile elements) such as the solvent and hydrated water of the complex solution, while leaving nitrogen in the lithium niobate layer. Hydrated water obstructs lithium ion conduction. Therefore, by reducing the remaining amount thereof, it is possible to reduce the reaction resistance. In addition, the active material composite particle according to the present disclosure is used, for example, for a lithium battery having a solid electrolyte. Among solid electrolytes, especially sulfide-based solid electrolytes degrade by reacting with water, and as a result, the reaction resistance of an all-solid-state battery having a sulfide solid electrolyte can easily increase. Therefore, by reducing the remaining amount of the solvent of the complex solution, it is possible to reduce the reaction resistance of a battery.

In addition, the temperature of the heating treatment in S3 is made lower than 350° C. Since S3 is carried out after S2, the precursor of lithium niobate is attached on the surface of the active material by S2, in which the complex solution is sprayed onto the active material, and at the same time the complex solution of the surface of the active material is dried. By attaching the precursor of lithium niobate onto the surface of the active material by S2 having a configuration as above, it is possible to form a lithium niobate layer even if the temperature of the heating treatment is lower than before. Here, if the temperature of the heating treatment is high, many gaps tend to be made in the lithium niobate layer. These gaps obstruct lithium ion conduction, to thereby contribute to the increase in the reaction resistance of a battery. Further, if the temperature of the heating treatment is excessively high, nitrogen possibly separates (is released) from the lithium niobate layer. Therefore, from this point as well, it is preferable that the temperature of the heating treatment is low.

In addition, if the temperature of the heating treatment is 350° C. or more in S3, crystallized lithium niobate is formed on the surface of the active material. The crystallized lithium niobate, having a lower lithium ion conductivity than that of amorphous lithium niobate, contributes to the increase in the reaction resistance of a battery.

Alcoxide solutions used in the conventional techniques include a lot of carbon. Therefore a lot of gas generates from a precursor of lithium niobate in a heating treatment, and as a result, lithium niobate having many gaps are easily formed. In addition, it is not possible to include nitrogen in the lithium nibate layer, therefore it is not possible to reduce the reaction resistance. In contrast, according to the manufacturing method using a solution including a peroxo complex of niobium, it is possible to reduce the amount of gas which generates from the precursor of lithium niobate in the heating treatment. Further, it is also possible to introduce nitrogen into the lithium niobate layer. As a result, it is possible to reduce the reaction resistance of the lithium niobate layer. In addition, the complex solution used in the method for manufacturing an active material composite particle of the present disclosure is cheaper than an alkoxide solution. Thus, in addition to the above effect, a reduction of the manufacturing cost can be achieved.

In the method for manufacturing an active material composite particle of the present disclosure, the lower limit of the temperature of the heating treatment in S3 is preferably no less than 150° C., and the upper limit is preferably no more than 300° C., more preferably no more than 250° C. This makes it possible to forma lithium niobate layer whose reaction resistance is further reduced.

4. Method for Manufacturing Lithium Battery

Figure 4:
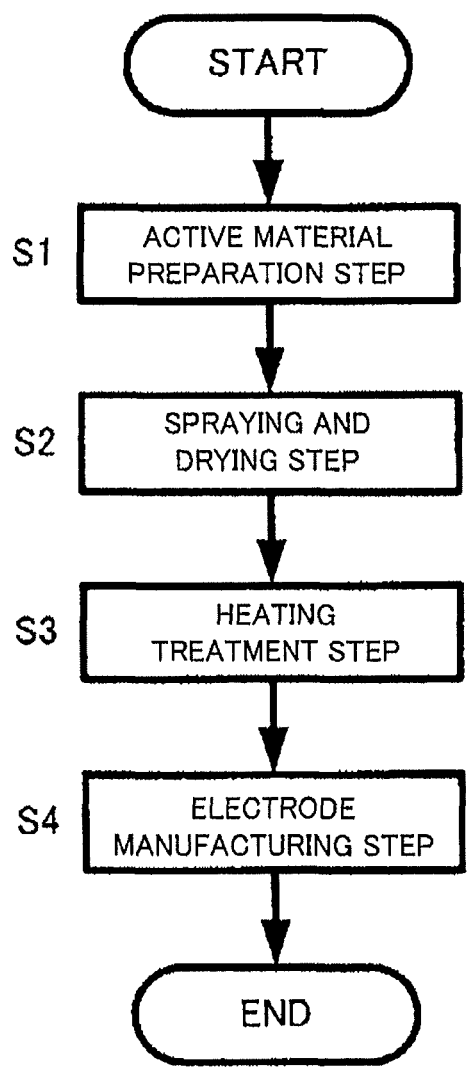
FIG. 4 is a flowchart to explain a method for manufacturing the lithium battery of the present disclosure.

FIG. 4 is a flowchart to explain the method for manufacturing a lithium battery of the present disclosure. In FIG. 4, for the same steps as the steps shown in FIG. 3, same signs as the signs used in FIG. 3 are used, and explanations thereof are adequately omitted.

The method for manufacturing a lithium battery of the present disclosure includes an active material preparation step (S1), a spraying and drying step (S2), a heating treatment step (S3), and an electrode manufacturing step (S4). S1 to S3 are as described above and explanations thereof are omitted.

4.1. Electrode Manufacturing Step (S4)

S4 is a step of manufacturing an electrode including the active material composite particle made by S1 to S3. For example, in a case where the lithium battery 20 shown in FIG. 2 is manufactured, S4 is a step of making the cathode 21 including the active material composite particle 10. In this case, S4 is not particularly limited as long as S4 is a step of making a cathode including the active material composite particle of the present disclosure. For example, the cathode 21 can be made by: adding the active material composite particle 10, the solid electrode 23a, the assistant 21a, and the binder 21b into a solvent; thereafter dispersing them by an ultrasonic homogenizer and the like, to make a cathode composition in a slurry form; applying the obtained cathode composition in a slurry form onto the surface of the cathode current collector 24; and thereafter drying it.

After the electrode (cathode) including the active material composite particle of the present disclosure is made, an electrode (anode) to sandwich an electrolyte layer with the electrode (cathode) is made. The method for making the anode is as described above. After one pair of electrodes is made in this way, a step of arranging an electrolyte layer between the cathode and the anode is carried out, whereby the lithium battery of the present disclosure can be made.

EXAMPLES

Example 1

(1) Preparation of Active Material

As an active material, a particulate $LiNi_{1/3}Mn_{1/3}Co_{1/3}O_2$ (manufactured by NICHIA CORPORATION) was used.

(2) Preparation of Complex Solution

To a container which 870.4 g of hydrogen peroxide water of 30 mass % in concentration was inside, 987.4 g of ion-exchange water and 44.2 g of niobium acid including nitrogen (3.4 mass % of nitrogen content ratio, manufactured by Conghua Tantalum & Niobium Smeltery) were added. Next, to the above container, 87.9 g of ammonia water of 28 mass % in concentration was added. Thereafter the contents of the container were sufficiently stirred, to obtain a transparent solution. Further, to the obtained transparent solution, 10.1 g of lithium hydroxide.1 hydrate ($LiOH·H_2O$) was added, whereby a complex solution including lithium and a peroxo complex of niobium was obtained. The mol concentrations of Li and Nb in the obtained complex solution were both 0.12 mol/kg.

(3) Spraying and Drying

The complex solution in an amount of 19570 g obtained by the above procedure was sprayed onto 1000 g of cathode active material, and at the same time, the sprayed complex solution was dried, by a tumbling fluidized coating machine (MP-01, manufactured by POWREX CORPORATION). Whereby, the surface of the cathode active material was covered by a layer including a precursor of lithium niobate. The operating conditions of the tumbling fluidized coating machine were, intake gas: nitrogen; intake temperature: 170° C.; flow amount of intake gas: 0.4 m³/min; number of revolutions of rotor: 400 per minute; spray speed: 14.4 g/min.

(4) Heating Treatment

To the particle having the cathode active material and the layer including a precursor of lithium niobate formed on the surface of the cathode active material, a heating treatment was carried out under the conditions of 200° C. for 5 hours in the atmosphere, whereby an active material composite particle having $LiNi_{1/3}Mn_{1/3}CO_{1/3}O_2$ and lithium niobate attached onto the surface of the $LiNi_{1/3}Mn_{1/3}CO_{1/3}O_2$ (active material composite particle of Example 1) was obtained.

(5) Manufacture of all-Solid-State Battery (5-1) Manufacture of Cathode

The obtained active material composite particle of Example 1 and a sulfide-based solid electrolyte ($Li_3PS_4$) were weighed so that they satisfied the active material composite particle:the sulfide-based solid electrolyte=6:4 by volume ratio, and added in a container which heptane was inside. Further, a conductive assistant (vapor-grown carbon fiber, manufactured by SHOWA DENKO K.K.) in an amount to be 3 mass % and a binder (butylene rubber, manufactured by JSR Corporation) in an amount to be 3 mass % were added to the container which heptane and the like were inside, whereby, a cathode slurry was made. Next, a cathode composition made by dispersing the obtained cathode slurry by an ultrasonic homogenizer (UH-50, manufactured by MST Corporation, the same is applied hereinafter) was applied on the upper surface of an aluminum foil, and subsequently dried at 100° C. for 30 minutes. Whereby, a cathode was formed on the upper surface of the aluminum foil. Next, the aluminum foil on which the cathode was formed on the upper surface was punched to 1 cm² in size, whereby a cathode was obtained.

(5-2) Manufacture of Anode

An anode active material (layered carbon) and a sulfide-based solid electrolyte ($Li_3PS_4$) were weighed so that they satisfied the anode active material:the sulfide-based solid electrolyte=6:4 by volume ratio, and added in a container which heptane was inside. Further, a binder (butylene rubber, manufactured by JSR Corporation) in an amount to be 1.2 mass % was added to the container which heptane, the anode active material and the like were inside, whereby, an anode slurry was made. Next, an anode composition made by dispersing the obtained anode slurry by an ultrasonic homogenizer was applied on the upper surface of a copper foil, and subsequently dried at 100° C. for 30 minutes. Whereby, an anode was formed on the upper surface of the copper foil. Next, the copper foil on which the anode was formed on the upper surface was punched to 1 cm² in size, whereby an anode was obtained.

(5-3) Manufacture of Solid Electrolyte Layer

To a tubular ceramics whose sectional area of inner diameter was 1 cm², 64.8 mg of sulfide-based solid electrolyte ($Li_3PS_4$) was added, and the surface was smoothed and pressed at a pressure of 98 MPa. Whereby, a solid electrolyte layer was formed.

The cathode and the anode were put in the tubular ceramics in such a manner that the solid electrolyte layer was arranged between the cathode and the anode, and pressed at a pressure of 421.4 MPa. Thereafter, a stainless stick was put into each of the cathode side and the anode side, and held at a pressure of 98 MPa. Whereby, an all-solid-state battery of Example 1 was made.

Example 2

An active material composite particle was made in the same manner as in Example 1, and an all-solid-state battery was made in the same manner as in Example 1, except that the spray amount of the complex solution was changed to 13050 g.

Example 3

An active material composite particle was made in the same manner as in Example 1, and an all-solid-state battery was made in the same manner as in Example 1, except that the spray amount of the complex solution was changed to 6525 g.

Example 4

An active material composite particle was made in the same manner as in Example 1, and an all-solid-state battery was made in the same manner as in Example 1, except that the spray amount of the complex solution was changed to 2350 g, and the intake temperature was changed to 120° C. and the spray speed was changed to 4.8 g/min in the operating conditions of the tumbling fluidized coating machine.

Example 5

An active material composite particle was made in the same manner as in Example 1, and an all-solid-state battery was made in the same manner as in Example 1, except that the spray amount of the complex solution was changed to 1830 g, and the intake temperature was changed to 150° C. and the spray speed was changed to 9.6 g/min in the operating conditions of the tumbling fluidized coating machine.

Example 6

An active material composite particle was made in the same manner as in Example 1, and an all-solid-state battery was made in the same manner as in the Example 1, except that the spray amount of the complex solution was changed to 1830 g, and the intake temperature was changed to 120° C., the flow amount of intake gas was changed to 0.3 m³/min, and the spray speed was changed to 9.6 g/min in the operating conditions of the tumbling fluidized coating machine.

Comparative Example 1

An active material composite particle was made with an alkoxide solution, instead of the peroxo complex solution.
(1) Preparation of Alkoxide Solution An alkoxide solution was made with ethoxylithium, pentaethoxyniobium, and anhydrous ethanol. Ethoxylithium was added in a container which anhydrous ethanol was inside, whereby dissolved, and uniformly dispersed in the anhydrous ethanol. Thereafter, to the above container which ethoxylithium and anhydrous ethanol were inside, pentaethoxyniobium was added so that lithium:niobium=1:1 by element ratio (mol ratio). Then, the contents of the container were stirred until pentaethoxyniobium was uniformly mixed, whereby an alkoxide solution was obtained. The adding amount of ethoxylithium was adjusted so that the solid content ratio of the alkoxide solution was 6.9 mass %.
(2) Spraying and Drying The alkoxide solution in an amount of 4660 g obtained by the above procedure was sprayed onto 1000 g of cathode active material, and at the same time the alkoxide solution was dried, by a tumbling fluidized coating machine (MP-01, manufactured by POWREX CORPORATION). Whereby, the surface of the cathode active material was covered by a layer including a precursor of lithium niobate. Here, the operating conditions of the tumbling fluidized coating machine were, intake gas: nitrogen; intake gas temperature: 80° C., flow amount of intake gas: 0.3 m³/h, number of revolutions of rotor: 300 per minute; spray speed: 1.5 g/min.
(3) Heating Treatment To the particle having the cathode active material and the layer including a precursor of lithium niobate formed on the surface of the cathode active material, obtained by the spraying and drying of the alkoxide solution, a heating treatment was carried out under the conditions of 350° C. for 5 hours in the atmosphere. Whereby, an active material composite particle having $LiNi_{1/3}Mn_{1/3}Co_{1/3}O_2$ and lithium niobate attached onto the surface of the $LiNi_{1/3}Mn_{1/3}Co_{1/3}O_2$ was obtained.
(4) Manufacture of all-Solid-State Battery An all-solid-state battery was made under the same conditions as in Example 1, except that the active material composite particle of Comparative Example 1 was used instead of the active material composite particle of Example 1.

<Reaction Resistance Measurement of all-Solid-State Battery>

Each all-solid-state battery manufactured by the above method was charged to 4.5 V of voltage, then discharged to 2.5 V. Thereafter an AC impedance measurement was carried out at 3.6 V. Then, from the curve obtained by Nyquist plot, the reaction resistance [Ω·cm²] of each all-solid-state battery was identified. The values obtained by rounding off the reaction resistances to three decimal places are shown in Table 1.

<Measurement of Nitrogen Ratio in Lithium Niobate Layer>

The "element concentration" of each element existing on the surface of the lithium niobate layer of the active material composite particle was identified by analyses of the surface of the active material composite particle, by a photoelectron spectroscopic analyzer (PHI Quantera SXM, manufactured by Physical Electronics). Specifically, the identification is carried out by calculating, after a peak-shift correction at C1s (248.7 eV), the element concentration from the peaks of photoelectron spectrum of Nb3d and N1s. The calculation of the element concentration was carried out with the following formula (1), on the basis of the peak intensity (peak area) of each element and its relative response factor.

[Formula 3]

$$C_i = \frac{(I_i/S_i)}{\sum_{j=1}^{N}(I_j/S_j)} \times 100 \qquad (1)$$

(In the formula (1), C is element concentration (atm %), I is intensity of photoelectron (peak area), S is relative response factor, and subscripts i, j are kinds of elements).

That is, the ratio ($C_N/C_{Nb}$) of the element concentration of nitrogen $C_N$ (atm %) to the element concentration of niobium $C_{Nb}$ (atm %) at the surface of the lithium niobate layer was calculated from the following formula (2).

Here, the relative response factor S was 3.127 for niobium and 0.499 for nitrogen. The results are shown in Table 1.

[Formula 4]

$$\frac{C_N}{C_{Nb}} = \frac{(I_N/S_N)}{(I_{Nb}/S_{Nb})} \quad (2)$$

TABLE 1

| | nitrogen ratio | resistance |
|---|---|---|
| Example 1 | 0.53 | 8.7 |
| Example 2 | 0.42 | 6.6 |
| Example 3 | 0.26 | 4.2 |
| Example 4 | 0.19 | 2.4 |
| Example 5 | 0.11 | 2.7 |
| Example 6 | 0.08 | 3.4 |
| Comparative Example 1 | 0 | 931.6 |

Figure 5:
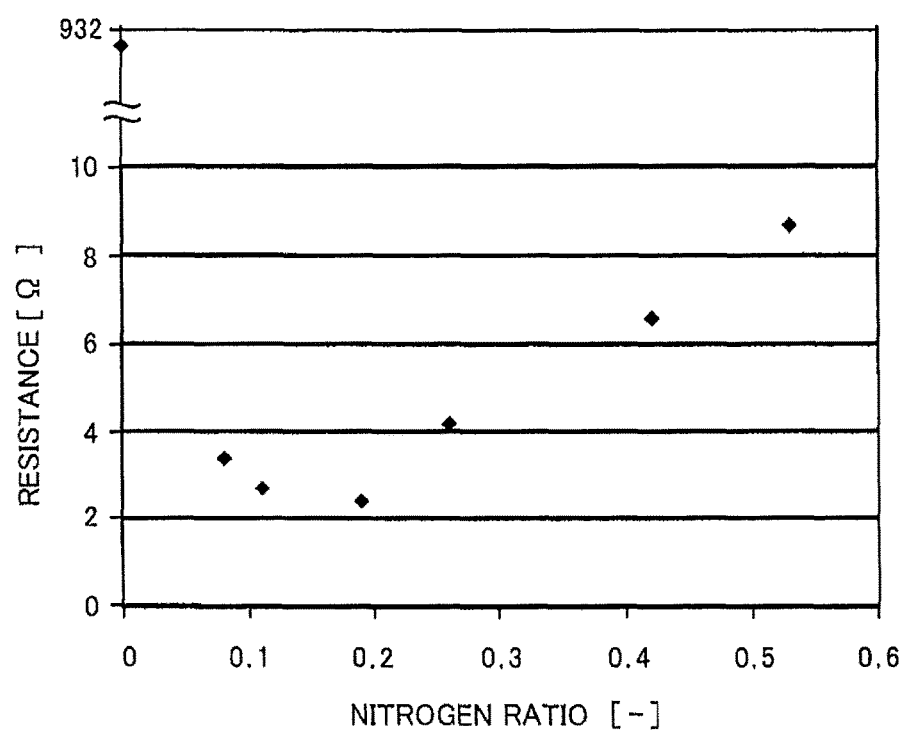
FIG. 5 is data showing the relationship between the nitrogen ratio in the lithium niobate layer and the reaction resistance of battery.

FIG. 5 shows the relationship between the nitrogen ratio at the surface of the lithium niobate layer of the active material composite particles and the resistance of the all-solid-state batteries.

As is obvious from Table 1 and FIG. 5, in a case where a battery was manufactured with the active material composite particle (active material composite particle including nitrogen in a lithium niobate layer) according to Example, it was possible to dramatically reduce the reaction resistance of the battery and dramatically increase the lithium ion conductivity, compared to a case where an battery was manufactured with the active material composite particle of Comparative Example. Particularly, in a case where the nitrogen ratio $C_N/C_{Nb}$ was no less than 0.08 and no more than 0.26, the reaction resistance of the lithium niobate layer 2 was reduced to approximately 1/300, and in a case where $C_N/C_{Nb}$ was no less than 0.11 and no more than 0.19, the reaction resistance was reduced to 1/400, compared to a case where nitrogen was not included.

INDUSTRIAL APPLICABILITY

The active material composite particle according to the present disclosure can be preferably used as an active material in a lithium battery including a solid electrolyte. Specifically, it is preferable that the active material composite particle is applied as a cathode active material of an all-solid-state lithium battery including a sulfide-based solid electrolyte.

REFERENCE SIGNS LIST 1 active material
2 lithium niobate layer
10 active material composite particle
20 lithium battery
21 cathode
22 anode
23 solid electrolyte layer

The invention claimed is:

1. A lithium battery comprising:
   a cathode that includes:
      an active material composite particle comprising:
         an active material, and
         a lithium niobate layer that includes nitrogen and is formed on a surface of the active material; and
      a sulfide-based solid electrolyte having contact with the active material composite particle;
   an anode; and
   an electrolyte layer having contact with the cathode and the anode,
   wherein a ratio ($C_N/C_{Nb}$) of an element concentration of the nitrogen ($C_N$) to an element concentration of niobium ($C_{Nb}$) on a surface of the lithium niobate layer is no less than 0.08 and no more than 0.53.

2. The lithium battery according to claim 1, wherein the sulfide-based solid electrolyte is selected from the group consisting of $Li_2S$—$SiS_2$, LiI—$Li_2S$—$SiS_2$, LiI—$Li_2S$—$P_2S_5$, LiL-$Li_2O$—$Li_2S$—$P_2S_5$, LiI—$Li_2S$—$P_2O_5$, LiI—$Li_3PO_4$—$P_2S_5$, $Li_2S$—$P_2S_5$ and $Li_3PS_4$.

3. The lithium battery according to claim 1, wherein a ratio ($C_N/C_{Nb}$) of an element concentration of the nitrogen ($C_N$) to an element concentration of niobium ($C_{Nb}$) on a surface of the lithium niobate layer is no less than 0.08 and no more than 0.26.

* * * * *